United States Patent [19]
Griffin et al.

[11] Patent Number: 4,773,212
[45] Date of Patent: Sep. 27, 1988

[54] BALANCING THE HEAT FLOW BETWEEN COMPONENTS ASSOCIATED WITH A GAS TURBINE ENGINE

[75] Inventors: James G. Griffin, West Hartford; Robert J. McHale, Manchester; Raymond A. Dreisbach, Jr., Old Saybrook; John P. Beck, South Windsor, all of Conn.

[73] Assignee: United Technologies Corporation, Hartford, Conn.

[21] Appl. No.: 249,765

[22] Filed: Apr. 1, 1981

[51] Int. Cl.[4] ............................................. F02C 7/12
[52] U.S. Cl. ................................. 60/39.02; 60/39.08; 60/39.83; 60/226.1; 60/267
[58] Field of Search ............. 60/39.83, 266, 267, 60/226 R, 39.08, 39.27, 39.02; 165/41, 51

[56] References Cited

U.S. PATENT DOCUMENTS

| | | | |
|---|---|---|---|
| 2,865,580 | 12/1958 | Marshall | 60/39.08 |
| 2,907,527 | 10/1959 | Cummings | 60/39.08 |
| 2,916,875 | 12/1959 | Morley et al. | 60/39.08 |
| 2,986,003 | 5/1961 | Buckingham | 60/39.08 |
| 3,080,716 | 3/1963 | Cummings et al. | 60/39.83 |
| 3,300,965 | 1/1967 | Sherlaw et al. | 60/39.08 |
| 3,779,007 | 12/1973 | Lavash | 60/39.83 |
| 3,975,903 | 8/1976 | Stearns | 60/39.27 |
| 4,041,697 | 8/1977 | Coffinberry et al. | 60/39.83 |
| 4,151,710 | 5/1979 | Griffin et al. | 60/39.08 |

FOREIGN PATENT DOCUMENTS 760243 10/1956 United Kingdom .
997260 7/1965 United Kingdom .

Primary Examiner—Louis J. Casaregola
Attorney, Agent, or Firm—Gene D. Fleischhauer

[57] ABSTRACT

Heat transfer systems for maintaining a thermal balance between a gas turbine engine and heat generating accessory components of the engine are disclosed. In the embodiment illustrated, heat is removed from the cooling system 48 of an electrical generator 46 and is transferred to the fuel supply system 32 of the engine. In one detailed embodiment, the cooling system 48 is in direct heat transfer communication with the downstream portion 62 of the fuel supply system through a heat exchanger 76 and in indirect heat transfer communication with the upstream portion 60 of the fuel supply system through the fuel recirculation system 42.

8 Claims, 3 Drawing Sheets

BALANCING THE HEAT FLOW BETWEEN COMPONENTS ASSOCIATED WITH A GAS TURBINE ENGINE

DESCRIPTION

1. Technical Field

This invention relates to axial flow gas turbine engines and particularly to the maintenance of a thermal balance between components which require cooling and components which require heating.

The components were developed in the gas turbine engine industry for matching the inverse heating and cooling requirements of the engine fuel control and electrical generator, but are more widely applicable to other components with similar heat load requirements.

2. Background Art

Axial flow gas turbine engines are typically formed of a compression section, a combustion section and a turbine section. Working medium gases are drawn into the compression section where they pass through several stages of compression causing the temperature and the pressure of the gases to rise. The gases are mixed with the fuel in the combustion section and burned to form hot pressurized gases. The gases are a source of energy to the engine. These gases are expanded through the turbine section to produce work. Both the compression section and the turbine section contain moving components, such as bearings. Lubricating oil is flowed to these components to both lubricate the components and to remove heat from the components. The heat gained by the lubricating oil is rejected to the fuel system as fuel is flowed from a source of fuel through a fuel control to the combustion section of the engine.

In fixed wing aircraft, such as those for which the present concepts were developed, the engine is mounted in a housing attached to a wing of the aircraft. The housing both supports and positions the engine with respect to the aircraft. Such aircraft fly at high altitudes for long periods of time at temperatures as low as 65° F. below zero (−65° F.). This low temperature cools the fuel in the fuel supply tanks to a low temperature. To block the formation of ice in critical components in the fuel supply system such as the fuel control, hot working medium gases are diverted from the working medium flow path of the compression section through a heater to heat the fuel. This heater is typically located in the nacelle in a compartment such as the core compartment.

Another piece of auxiliary equipment disposed in the nacelle compartment is an electrical generator for supplying aircraft electric power. The production of electric power is accompanied by the production of heat which must be removed to preserve the operating life of the electrical generator. A construction for removing the heat is shown in U.S. Pat. No. 4,151,710 entitled "Lubrication Cooling System for Aircraft Engine Accessory" issued to Griffin et al. In Griffin, the heat is removed by lubricating oil passing through the generator. The heat is rejected to cooling air through a primary heat exchanger located in a working medium flow path of the engine and to the fuel through a secondary heat exchanger in communication with fuel being flowed to the combustion chambers.

Another approach to cooling the electrical generator is described in a copending U.S. patent application Ser. No. 249,766, assigned to the assignee of this invention. Heat is rejected primarily to fuel through a heat exchanger in communication with fuel being flowed to the combustion chambers and secondarily to air ducted from the working medium flow path through an on/off heat exchanger remote from the flow path which is located in a nacelle compartment. Using fuel as the primary coolant results in the recovery of energy from the electrical generator by the engine. In addition, using fuel as the primary coolant reduces the size of the cooling air heat exchanger and enables installation of the heat exchanger in a compartment remote from the airstream to minimize the intrusion of the heat exchanger into the airstream.

DISCLOSURE OF THE INVENTION

According to the present invention, a thermal balance is maintained between a gas turbine engine and accessory components of the engine by transferring heat from an electrical generator driven by the engine to a fuel control controlling the flow of fuel to the engine for the purposes of inhibiting the formation of ice in the fuel control and, at the same time, cooling the electrical generator.

In accordance with one specific embodiment of the present invention, heat transferred to the cooling system of the electrical generator from the fuel system downstream of the fuel control during a transient imbalance in the fuel system resulting from a sudden decrease in engine power is transferred back to the fuel system upstream of the fuel control to cool the cooling system and to heat the fuel control.

This invention is predicated on the recognition that such a cooling system may be improved by recovering additional energy in the form of heat from the electrical generator rather than by rejecting such heat to cooling air bypassed from the working medium flow path. The additional energy recovered in the form of heat is used to replace heat for the fuel control previously obtained from the hot working medium gases bypassed from the primary flow path for heating.

A primary feature of the present invention is an electrical generator which produces waste heat and thus is capable of acting as a source of heat. Another feature of the present invention is a fuel control which requires heating at low temperatures. A heat exchanger is in fluid communication with cooling fluid flowed through the electrical generator and the fuel flowed through the fuel control. In one specific embodiment the heat exchanger is in fluid communication with a conduit for recirculating pressurized fuel from an outlet in the fuel control through a hydraulic vane controller to an inlet in the fuel control. In another embodiment, a first heat exchanger is disposed in the fuel line downstream of the fuel control for transferring heat from the engine oil to the engine fuel. A second heat exchanger is disposed in the fuel line downstream of the first heat exchanger for transferring heat from the cooling fluid to the engine fuel. A fourth heat exchanger for transferring heat from the cooling fluid to low temperature working medium gases is in fluid communication with the electrical generator.

A primary advantage of the present invention is the gain in engine efficiency which results from inhibiting the formation of ice in the fuel control with waste heat from the electrical generator rather than by transferring heat from the working medium flow path of the engine to perform the inhibiting function. Another advantage is the gain in engine efficiency which results from using the fuel flowed through the fuel control as a heat sink during flight idle operation rather than by removing an equivalent amount of heat from the generator cooling fluid in a heat exchanger cooled by fan air.

In one specific embodiment, an advantage is the efficiency which results from rejecting heat to the fuel entering the fuel control during transient conditions following a sudden reduction in power when, because of a temporary temperature imbalance, the fuel downstream of the fuel control rejects heat to the cooling fluid through a heat exchanger between the fuel and the cooling fluid.

The foregoing, and other objects, features and advantages of the present invention will become more apparent in the light of the following detailed description of the preferred embodiment thereof as shown in the accompanying drawing.

BEST MODE FOR CARRYING OUT THE INVENTION

Figure 1:
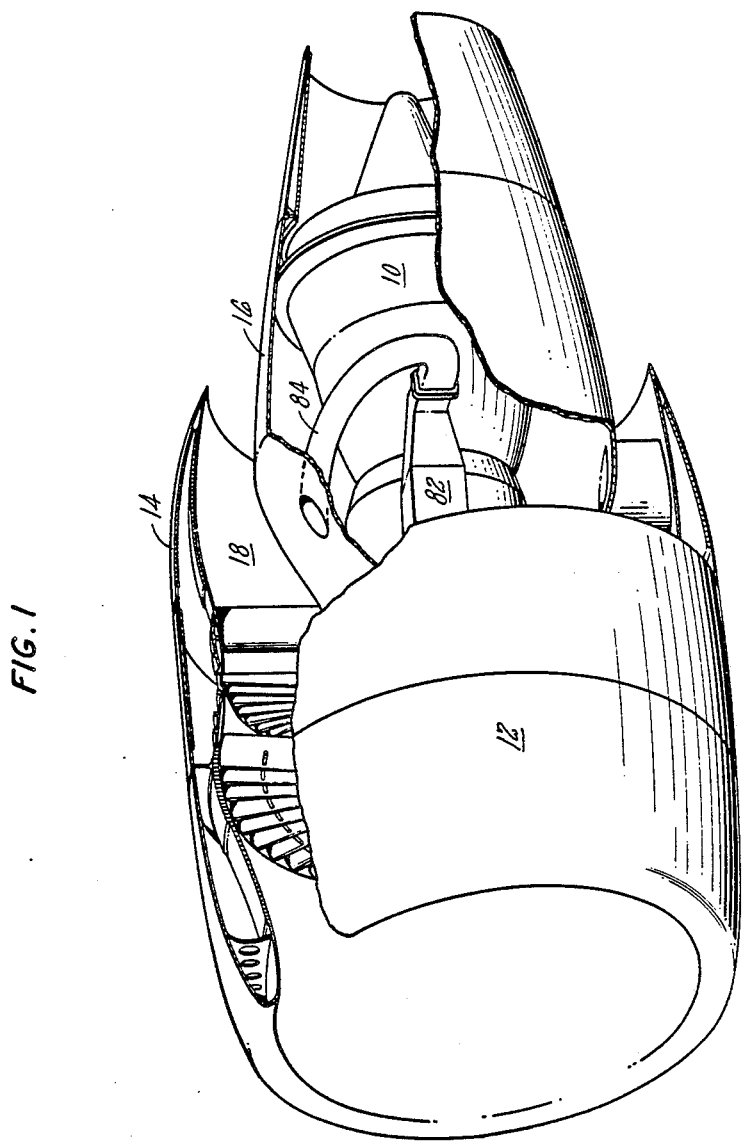
FIG. 1 is a partial perspective view of an axial flow gas turbine engine of the turbofan type mounted in an aircraft nacelle with a portion of the fan compartment and the core compartment broken away to show portions of the engine and accessory equipment.

A gas turbine engine 10 of the axial flow, turbo-fan type is shown in FIG. 1. A nacelle 12 circumscribes the engine. The nacelle is adapted to both support and position the engine from a support structure such as an aircraft wing. The nacelle includes compartments for housing auxiliary equipment such as a nacelle fan compartment 14 and a nacelle core compartment 16.

Figure 2:
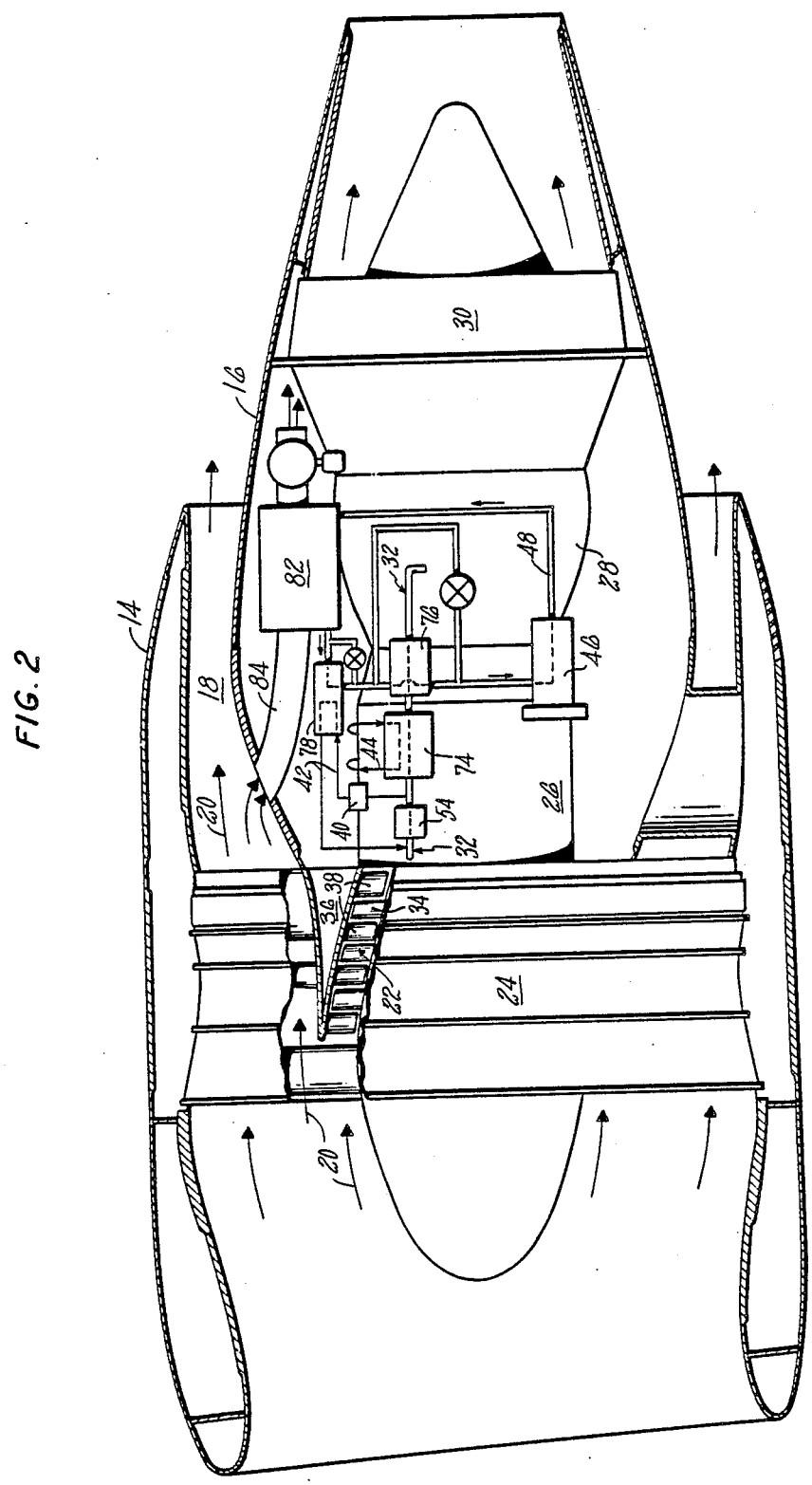
FIG. 2 is a diagrammatic illustration of the primary flow path, the secondary flow path of the gas turbine engine and a portion of the accessory equipment disposed in the nacelle core compartment about the gas turbine engine.

As shown diagrammatically in FIG. 2, the core compartment 16 is spaced radially inwardly of the fan compartment 14 leaving a fan bypass duct 18 therebetween. A secondary flow path 20 for working medium gases extends through the bypass duct. A primary flow path 22 for working medium gases extends rearwardly through the engine which is formed of a fan section 24, a compressor section 26, a combustion section 28 and a turbine section 30. A fuel supply system 32 is in fluid communication with the combustion section.

The fan section and the compressor section together are commonly referred to as the compression section. The compression section and the turbine section include rotor components 34 and stator components 36. The stator components include variable stator vanes 38 which extend across the primary flow path 22 for working medium gases. A hydraulic vane controller 40 for positioning the vanes is linked to the vanes. A fuel recirculation system 42 for providing hydraulic power is in fluid communication with the hydraulic vane controller such that the hydraulic vane controller develops a hydraulic force in response to the flow of perssurized fuel. An engine oil system 44 is provided for lubricating rotating ccmponents such as bearings which support the rotor components.

A component which produces excess heat, such as an electrical generator 46 for supplying electric power to the aircraft at a constant frequency, is also housed in the core compartment 16. The electrical generator is driven by the gas turbine engine. A cooling system 48 for the electrical generator is in fluid communication with the generator.

Figure 3:
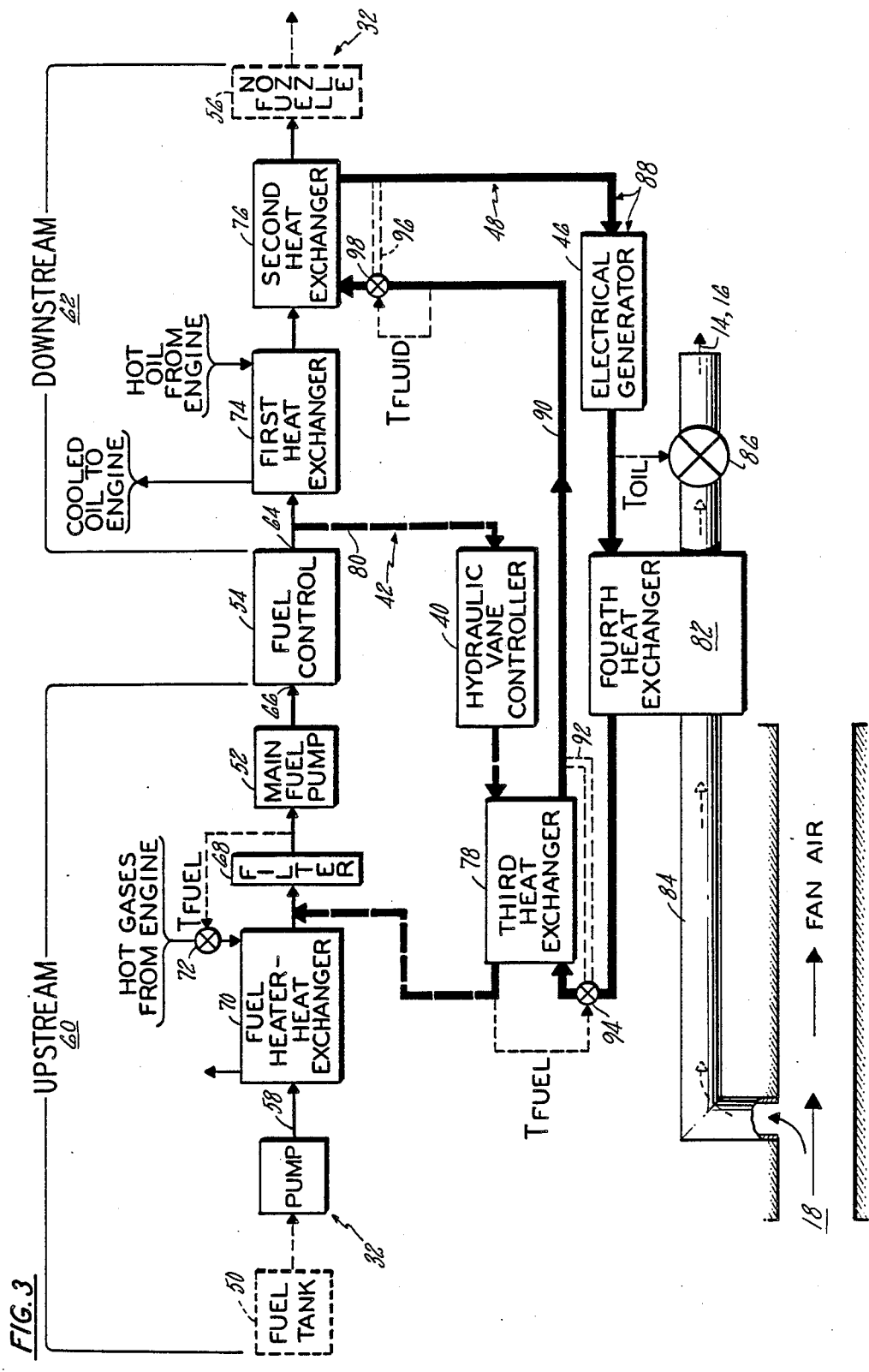
FIG. 3 is a schematic diagram of a portion of the fuel supply system, a fuel recirculation system and a cooling system for the electrical generator.

FIG. 3 shows in greater detail the cooling system 48, the fuel recirculation system 42 and the fuel supply system 32. The fuel supply system includes a fuel tank 50 typically disposed in the wing of the aircraft, a main fuel pump 52 and fuel control 54, and a means for injecting fuel into the combustion chamber of the engine such as a fuel nozzle 56. A fuel line 58 for ducting fuel extends from the tanks through the main fuel pump and fuel control to the fuel nozzle.

The. fuel supply system 32 has an upstream portion 60 and a downstream portion 62. The upstream portion extends between the fuel tank 50 and the fuel control 54. The downstream portion extends between the fuel nozzle 56 and the fuel control. The fuel control is adapted by an outlet 64 to discharge fuel into the downstream portion of the fuel supply system and by an inlet 66 to receive fuel from the upstream portion of the fuel supply system. The upstream portion includes a filter 68 and a means for heating the engine fuel such as the heat exchanger 70. The heat exchanger is in fluid communication with a source of heat such as hot working medium gases from the primary flow path. For example, these gases might be drawn from a rear stage of the compressor section. A valve 72 for controlling the flow of hot gases through the heat exchanger is responsive to the temperature of the fuel entering the fuel control. The downstream portion 62 of the fuel system includes a means, such as a first heat exchanger 74, for transferring heat from the engine oil to the fuel. The downstream portion also includes a means, such as a second heat exchanger 76, for transferring heat between the fuel in the fuel line and cooling fluid in the cooling system 48 for the electrical generator.

The fuel recirculation system 42 extends between the downstream portion 62 of the fuel system and the upstream portion 60. The fuel recirculation system includes a means, such as a third heat exchanger 78, for transferring heat from the cooling fluid in the cooling system 48 to the fuel in the fuel recirculation system. The fuel recirculation system includes a conduit 80. This conduit is in fluid communication with the outlet 64 of the fuel control, the hydraulic vane controller 40, the third heat exchanger 78 and the inlet 66 of the fuel control. As will be realized, the conduit may be in fluid communication with the inlet of the fuel control through the upstream portion of the fuel line either upstream or downstream of the filter 68 or downstream of the pump 52.

The cooling system 48 for the electrical generator 46 includes a means, such as a fourth heat exchanger 82, for transferring heat from the cooling fluid to cooling air. A conduit 84 extends between the fan duct 18 and the fourth heat exchanger to place the fourth heat exchanger in fluid communication with a source of cooling air. The cooling air is discharged from the heat exchanger and exhausted into a nacelle compartment such as the nacelle fan compartment 14 or the nacelle core compartment 16. A valve 86 for regulating the fan air flow through the conduit 84 is responsive to the temperature of the cooling fluid in the cooling system 48 at the point of discharge from the electrical generator. A means 88 for circulating the cooling fluid in the cooling system includes a pump (not shown) and a conduit 90. As will be realized, the pump might be an integral portion of the electrical generator. The means is used to place the cooling fluid in fluid and heat transfer communication with the electrical generator, the fourth heat exchanger, the third heat exchanger 78 and the second heat exchanger 76. The means 88 for circulating the cooling fluid includes a bypass conduit 92 which connects the inlet and the outlet of the third heat exchanger to prevent the transfer of an excessive amount of heat to the fuel. A valve 94 responsive to the temperature of the fuel in the fuel recirculation system 42 is used to regulate the flow of cooling fluid through the third heat exchanger. A second bypass conduit 96 connects the inlet and discharge ports of the second heat exchanger to prevent the loss of heat from the cooling fluid during low temperature start-up of the engine. A valve 98 responsive to the temperature of the cooling fluid and the cooling system regulates the flow of cooling fluid through the bypass conduit around the second heat exchanger.

During operation of the gas turbine engine, working medium gases in the form of air are drawn into the gas turbine engine and compressed in the compressor section 26 causing the temperature and the pressure of the working medium gases to increase. The gases are flowed to the combustion section. Fuel from the fuel tank 50 is injected by the fuel and gases are mixed and burned to increase the temperature of the working medium gases. The gases are expanded through the turbine section 30 to power the aircraft to which the engine is attached.

Moving components of the engine are lubricated by engine oil flowed through the engine oil system 44 to the components. The oil reduces but does not eliminate friction between the parts. Heat generated by this friction is transferred to the engine oil and is carried by the oil to the first heat exchanger 74. The heat is transferred from the engine oil to fuel flowed through the fuel supply system 32 to the fuel nozzles 56. Heat is also produced by the electrical generator 46. This heat results primarily from resistance heating of the generator elements during the production of aircraft power and secondarily from mechanical friction and viscous friction associated with operation of the electrical generator and pumping of the cooling fluid. The heat is transferred to the cooling fluid which is flowed through the cooling system 48. As with the engine bearings, the cooling fluid is preferably the lubricating oil. After the cooling fluid is flowed through the electrical generator the heat from the cooling fluid is rejected under most operating conditions to both the combustion fuel in the downstream portion 62 of the fuel supply via the second heat exchanger 76 and to the pressurized fuel in the fuel recirculation system 42 via the third heat exchanger 78. The pressurized fuel is flowed to the fuel control 54. Heat is transferred from the fuel to the fuel control.

At low power operation the flow of combustion fuel passing through the first and second heat exchangers 74, 76 in the downstream fuel line is much reduced as compared with high power operation. The amount of heat transferred from the hot lubricating oil of the engine through the first heat exchanger to the combustion fuel coupled with the low fuel flow at low power greatly raises the temperature of the fuel. The higher temperature of the fuel diminishes at low power the ability of the second heat exchanger to remove heat from the cooling fluid passing through the electrical generator 46. By rejecting heat from the cooling fluid via the third heat exchanger 78 to fuel in the recirculation system 42, the need for using the fourth heat exchanger 82 is reduced and, in most cases, is completely eliminated. This is important because the fourth heat exchanger is used to transfer heat from the cooling fluid to working medium gases flowed from the compression section of the engine. As will be realized the loss of these gases, for example, from the secondary flow path 20, decreases the efficiency of the engine.

Use of the third heat exchanger 78 is also important at high altitude, low power operation. At high altitude operation, the fuel flowing from the fuel tank 50 may be at temperatures as low as sixty-five degrees Fahrenheit below zero ($-65°$ F.; $-53°$ C.). The presence of moisture in the fuel may cause ice to form in a fuel. The transfer of heat from the cooling fluid in the cooling system to the recirculated fuel blocks the formation of ice in the fuel control at most low power operating conditions. The recirculated fuel also carries heat from the third heat exchanger to fuel entering the filter. This heat warms the fuel to a temperature which blocks the accretion of wax-like paraffin on the filter and accordingly avoids the deterioration in filter performance associated with such a build-up. Thus, use of the third heat exchanger avoids at low power (reduces at high power) the need to use hot working medium gases diverted from the primary flow path to the heat exchanger 70 for heating the fuel. In summary, a thermal balance in the engine is maintained at low power by transferring heat from the electrical generator to the fuel control to block the formation of ice in the fuel control and to cool the electrical generator at low fuel flows.

At high power operation, as compared with low power operation, a large amount of heat per unit time is generated by engine components which are cooled by the lubricating oil flowing through the engine through the engine oil system 44. A sudden reduction in power, such as a decrease in power from cruise to flight idle, reduces the fuel flow through the first and second heat exchangers 74, 76 in the downstream portion of the fuel line. For a short period of time thereafter the large amount of heat that has built up in engine components and in the engine oil must be removed through the first heat exchanger 74 with the reduced fuel flow. As a result, the fuel temperature rapidly increases until it exceeds the temperature of the cooling fluid flowed in the cooling system 48 for the electrical generator 46. This results in heat being transferred via the second heat exchanger 76 to the cooling fluid. Thus, for a short period of time, the cooling fluid does not reject heat to the fuel but receives heat from fuel passing through the second heat exchanger. By employing the third heat exchanger 78, this heat from the downstream portion of the fuel line is transferred back to the upstream portion of the fuel line from the cooling fluid. Transferring the heat back into the fuel minimizes the transient effect on the temperature and the heat capacity of the cooling fluid that results from the sudden reduction in power setting of the engine and has the beneficial effect on the fuel control and the filter outlined above. In addition, use of the third heat exchanger reduces the need during the transient period for using the fourth heat exchanger with its inherent loss in engine efficiency to remove the heat from the cooling fluid.

Although the invention has been shown and described with respect to preferred embodiments thereof, it should be understood by those skilled in the art that various changes and omissions in the form and detail thereof may be made therein without departing from the spirit and the scope of the invention.

We claim:

1. A method for maintaining a thermal balance in a gas turbine engine operating at variable operating conditions which has a combustion section for burning a first portion of fuel to produce power and which has, a fuel system to supply fuel, the fuel system having a fuel at a temperature which is lower than the freezing point of water under certain operating conditions, wherein a fuel control having an inlet and an outlet for fuel is used to control the flow of fuel in the fuel system and wherein a generator for producing electrical power is driven by the engine, including the steps of:

transferring heat from the electrical generator to the feel control by transferring heat from the electrical generator to a second portion of fuel in the fuel system to heat the fuel and to cool the electrical generator, flowing all of the heated fuel to the inlet of the fuel control and through the fuel control to the outlet of the fuel control to heat the fuel control to inhibit the formation of ice in the fuel control, and flowing an amount of fuel through the fuel control which is greater than the first portion of fuel and which is greater than the second portion of fuel.

2. The method for maintaining a thermal balance as claimed in claim 1 wherein the step of transferring heat from the electrical generator to the fuel control includes the step of recirculating a portion of the fuel flowed through the fuel control from a point in the fuel supply system downstream of the fuel control to a point in the fuel supply system upstream of the fuel control and transferring heat from the electrical generator to the fuel being recirculated.

3. The method for maintaining a thermal balance as claimed in claim 2 wherein the step of transferring heat from the electrical generator to the fuel control includes the step of circulating a cooling fluid through the electrical generator and transferring heat from the cooling fluid to the recirculated fuel.

4. A method for maintaining a thermal balance in an axial flow gas turbine engine operating at low power and having a combustion section in which fuel is burned to produce power, wherein a fuel supply system is used to deliver fuel to the combustion chamber, wherein a fuel control having an inlet and outlet in the fuel supply system is used to control the flow of fuel through the supply system, wherein a heat exchanger in the fuel supply system downstream of the fuel control is used to cool oil circulated through the engine by rejecting heat from the oil to the fuel and wherein an electrical generator driven by the engine is used to produce electrical power and waste heat, including the steps of:

transferring heat from the electrical generator to a cooling fluid;

transferring heat between the cooling fluid and the fuel supply system at a point downstream of the engine oil heat exchanger;

recirculating a portion of the fuel flowing through the fuel control from a point between the engine oil heat exchanger and the fuel control to a point upstream of the fuel control;

transferring heat from the cooling fluid to the recirculated fuel; wherein the effect on the cooling fluid temperature of transient heat transfer from the fuel downstream of the fuel control to the cooling fluid during sudden reductions in power is reduced by transferring heat from the cooling fluid to fuel upstream of the fuel control.

5. A turbofan, gas turbine engine having a fan bypass duct into which pressurized air fron the fan is discharged and of the type in which fuel consumption is controlled by a fuel control having an inlet and outlet for fuel, in which bearings are used and engine oil is used to lubricate the engine bearings and in which an electrical generator producing electrical power produces excess heat and is cooled by a cooling fluid wherein the improvement comprises:

(1.) a fuel supply system which includes
  (1a) an upstream portion in fluid communication with the inlet of the fuel control, and
  (1b) a downstream portion in fluid communication with the outlet of the fuel control, the downstream portion including
    (1bi) a first heat exchanger in fluid communication with the downstream portion of the fuel line for transferring heat from the engine oil to the fuel,
    (1bii) a second heat exchanger in fluid communication with the downstream portion of the fuel line for transferring heat between the cooling fluid and the fuel;

(2) a fuel recirculation system which includes
  (2a) a conduit for recirculating pressurized fuel which extends between the downstream portion of the fuel supply system and the upstream portion of the fuel supply system,
  (2b) a hydraulic vane controller in fluid communciation with the fuel recirculation conduit,
  (2c) a third heat exchanger in fluid communication with the fuel recirculation conduit for transferring heat from the cooling fluid to the recirculated fuel; and (3) a cooling system for the electrical generator which includes
  (3a) a fourth heat exchanger for transferring heat from the cooling fluid to fan air,
  (3b) a conduit for ducting fan air from the bypass duct to the fourth heat exchanger, and
  (3c) a conduit for cooling fluid in fluid and heat transfer communication with the electrical generator, the fourth heat exchanger, the third heat exchanger and the second heat exchanger;

wherein the third heat exchanger transfers heat from the cooling fluid to fuel in the upstream portion of the fuel supply system to minimize the transient effect of the heat transferred from the engine oil to the cooling fluid through the first and second heat exchangers in the downstream portion of the fuel line during a sudden reduction in the power setting of the engine.

6. In a gas turbine engine of the type in which fuel having water molecules is burned to produce power and the flow of fuel is controlled by a fuel control having an inlet and an outlet, and in which heat is produced by an electrical generator driven by the engine, the improvement which comprises:

means for transferring heat from the electrical generator to the fuel control which includes
  a heat exchanger in heat transfer communciation with the electrical generator, a fuel pump for pressurizing fuel passing through the fuel control, and a conduit for recirculating pressurized fuel which is in fluid communication with the outlet of the fuel control, the heat exchanger, and the inlet to the fuel control such that the fuel recirculated through the conduit receives heat from the electrical generator as it passes through the heat exchanger and transfers heat to the fuel control as the fuel passes through the fuel control to inhibit the formation of ice in the fuel control and to cool the electrical generator.

7. The gas turbine engine of claim 6 which further includes stator vanes and a hydraulic vane controller for positioning stator vanes in the engine, said hydraulic vane controller being in fluid communication with the conduit for recirculating pressurized fuel such that the hydraulic vane controller develops a hydraulic force in response to the flow of pressurized fuel and receives heat from the fuel.

8. The gas turbine engine of claim 6 or claim 7 which includes a filter upstream of the fuel control and wherein the recirculated fuel passes through the filter before entering the fuel control such that heat transferred to the filter blocks the accretion of wax-like paraffin on the filter.

* * * * *

UNITED STATES PATENT AND TRADEMARK OFFICE
CERTIFICATE OF CORRECTION

PATENT NO. : 4,773,212

DATED : September 27, 1988

INVENTOR(S) : James G. Griffin et. al.

It is certified that error appears in the above-identified patent and that said Letters Patent is hereby corrected as shown below:

Claim 1, Column 7, line 20, "feel" should read --fuel--

Claim 4, Column 7, line 54, insert "fuel" before --supply--

Claim 5, Column 8, line 9, "fron" should read --from--

Signed and Sealed this

Eighteenth Day of July, 1989

Attest:

DONALD J. QUIGG

Attesting Officer

Commissioner of Patents and Trademarks